Patented Dec. 6, 1949

2,490,291

UNITED STATES PATENT OFFICE 2,490,291

TREATMENT OF WELLS

Gilbert G. Wrightsman, Houston, Tex., assignor, by mesne assignments, to Standard Oil Development Company, Elizabeth, N. J., a corporation of Delaware No Drawing. Application December 20, 1946, Serial No. 717,611

5 Claims. (Cl. 252—8.55)

The present invention is directed generally to well drilling such as the drilling of oil wells for the production of crude petroleum. More particularly, the invention is directed to the treatment of the filter cake which forms on the face of the producing formation as a result of the precipitation on or plastering of the formation with solids from the drilling fluids which are circulated in the boreholes in the process of rotary drilling.

In the practice of rotary drilling such as carried out in the drilling of oil and gas wells, a mud or clay laden fluid is circulated in the borehole to remove the cuttings, to assist in the drilling, to lubricate the bit, and to prevent the loss of fluid from the borehole to porous formations which may be penetrated by the drill. The drilling mud is a fluid made from clay occurring at the location of the well or it may be synthetically compounded from clay and mud bases available to the industry. These drilling muds, therefore, comprise a high content of solids to liquids and by virtue of the nature of the mud has a tendency to precipitate these solids on the face of the formations. In fact, it is this property of the drilling muds that makes it highly suitable in walling off undesirable formations encountered, for example, in the drilling of oil wells. However, the property of the drilling mud to wall off undesirable formations constitutes a disadvantage when production of an oil well is contemplated. The drilling mud, by virtue of its nature, also plasters or forms a filter cake on the producing formation and thus substantially reduces the ability of a formation to produce or at times may even shut off production entirely.

In the completion of an oil well, it is frequently necessary to use a screen or a gravel pack to retain in the strata the particles of the formation materials and to prevent their production along with the desirable fluid, in this instance crude petroleum. It is common practice to wash the drilling mud from the screen or gravel pack with water prior to setting the straining device. Such practices usually eliminate the bulk of the drilling fluid from the bottom of the well and from the gravel pack or the straining device. However, a filter cake of particles from the drilling fluid usually remains intact on the face of the formation. This filter cake frequently reduces substantially production from the producing formation and when it does not remain on the face of the formation it becomes dislodged and clogs the screen or gravel pack, thus reducing the rate of flow from the well.

It is, therefore, one object of my invention to remove the filter cake from the face of the producing formation.

Another object is to remove the filter cake in a form that will easily pass through the gravel pack or the openings in the filter screen and be produced with the fluid from the well, and thus remove it from the screen where it gives most trouble.

Another object of my invention is to treat oil wells to allow increased production therefrom.

The objects of the present invention are achieved by treating wells and particularly the formation, from which it is desired to produce, with an aqueous solution of stannous chloride.

Accordingly, the present invention may be described briefly as embodying the steps of forming an aqueous solution comprising between about 2% and 10% by weight of stannous chloride, introducing said solution into a borehole adjacent to and in contact with a producing formation, and forcing said solution by the application of pressure into the formation.

As mentioned before, the amount of stannous chloride should be in the range between 2% and 10% by weight. The solution may be made up with water or other aqueous media. It may be desirable to incorporate with the solution a wetting agent which will allow the solution to penetrate the producing formation more easily. Suitable wetting agents are known to the trade and may include the alkyl aryl sulfonates, which are sold under many trade names. Similarly, other wetting agents may be incorporated therewith which will allow the producing formation and the filter cake to be preferentially wet by the solution.

As examples of the solutions finding use in the present invention may be mentioned aqueous solutions of stannous chloride containing between about 2% and 10% by weight of the salt. These solutions have the ability to coagulate the clays in the filter cake and to render the filter cake permeable to fluids.

In accordance with the present invention, it was found possible to inject fluids easily through mud filter cakes made up from high water loss muds and a so-called fair natural mud after treatment with a 4% solution of stannous chloride. Furthermore, it was found that the permeability of the treated mud was independent of the filtration properties of the original drilling mud. Conversely, when the mud filter cake was not treated with a stannous chloride solution, it was very difficult to inject fluid through the filter cake.

In a commercial oil well identified as the J. B. Stakes 5, North Crowley, Louisiana, a drilling fluid was used in the reworking of the well, made up from "Aquagel," a commercial clay sold for the purpose of making up drilling muds, and "Baroid," a commercial weighting material. The drilling fluid made up from these materials weighed 9.8 pounds per gallon and had a filtration rate of 11 cc. in 30 minutes at 100 pounds per square inch in the standard A. P. I. filtration test. Prior to producing this well from a formation between 7190 and 7193 feet, the formation was treated by injecting through the casing a 4% solution of stannous chloride. Eleven minutes were required to inject 4 barrels of the aforesaid solution into the formation at the subsurface level given, with a maximum pump pressure of 1000 pounds per square inch.

Prior to the injection of the stannous chloride solution, 0.5 barrel of salt water was injected in 5 minutes time at the same pressure mentioned before. After the producing formation had been treated with 4 barrels of 4% stannous chloride solution, 6 barrels of a reactive plastic forming fluid was injected into the formation in 7 minutes at 1000 pounds per square inch pump pressure. It will be seen from the foregoing that, whereas 5 minutes time was required to inject a half barrel of salt water into the pump formation, it was possible to pump 6 barrels of a much more viscous material in 7 minutes when the formation had been treated in accordance with the present invention.

The present invention is susceptible to many modifications. For example, the solution of stannous chloride may be pumped into the borehole in a quantity only sufficient to treat the formation from which production is to be obtained. It is also possible to pump the solution into the producing formation at a rate sufficient to cause wide dispersion of the treating reagent throughout the producing formation adjacent the borehole. It is also within the spirit and scope of the present invention to treat the producing formation after the well has been on production for a period of time and conditions warrant its servicing. It will be apparent to a skilled worker that after production has been substantially depleted that production may be restored by treating the producing formation with a solution of stannous chloride.

It is unnecessary to leave the treating solution in contact with the producing formation for any appreciable length of time since the reaction is nearly instantaneous, with the filter cake disintegrating into small pieces which may be produced from the well without clogging the screening device. From the foregoing it will be apparent that the present invention allows an increase in the rate at which fluids may be produced from the formation into the well and also to increase the ultimate production from a given well.

The nature and objects of the present invention having been completely described and illustrated, what I wish to claim as new and useful and to secure by Letters Patent is:

1. A method for treating boreholes which comprises the steps of forming a solution consisting of stannous chloride and water, introducing said solution into a borehole adjacent a producing formation, and forcing said solution into the formation.

2. A method for treating a filter cake formed on a producing formation in a borehole by deposition of solids from a drilling fluid which comprises the steps of forming a solution consisting of stannous chloride and water, introducing said solution adjacent to said filter cake, and forcing said solution through the filter cake.

3. A method for treating an oil well to increase the permeability of the filter cake deposited on the face of a producing formation which comprises the steps of forming a solution consisting of stannous chloride and water, introducing said solution adjacent said filter cake, and forcing said solution through the filter cake.

4. A method in accordance with claim 3 in which the solution comprises between 2 and 10% by weight of the salt.

5. A method for treating a producing formation to increase the permeability thereof which includes the steps of forming a solution consisting of stannous chloride and water, the stannous chloride approximating 4% by weight of the solution, introducing said solution into contact with a producing formation and forcing said solution into said producing formation at a pressure of about 1000 pounds per square inch.

GILBERT G. WRIGHTSMAN.

REFERENCES CITED

The following references are of record in the file of this patent:

UNITED STATES PATENTS

| Number | Name | Date |
|---|---|---|
| 2,140,183 | Bresler | Dec. 13, 1938 |
| 2,234,790 | Zacher | Mar. 11, 1941 |
| 2,324,254 | Bertness et al. | July 13, 1943 |